(12) United States Patent
Battisti

(10) Patent No.: US 7,637,715 B2
(45) Date of Patent: Dec. 29, 2009

(54) ANTI-ICING SYSTEM FOR WIND TURBINES

(76) Inventor: Lorenzo Battisti, Via 3 Novembre No. 63, I-38100 Trento (IT)

( * ) Notice: Subject to any disclaimer, the term of this patent is extended or adjusted under 35 U.S.C. 154(b) by 656 days.

(21) Appl. No.: 11/108,546

(22) Filed: Apr. 17, 2005

(65) Prior Publication Data
US 2005/0242233 A1 Nov. 3, 2005

(30) Foreign Application Priority Data

Oct. 17, 2002 (IT) ............................ TO2002A0908
Oct. 16, 2003 (WO) ........................ PCT/IB03/04551

(51) Int. Cl.
*F03D 11/00* (2006.01)
(52) U.S. Cl. ............................. 415/115; 416/91; 290/55
(58) Field of Classification Search .................. 415/4.1, 415/4.2, 4.3, 4.4, 4.5, 115, 908; 416/39, 416/41, 93 R, 94, 91, 97 R, 98, 231 R, 231 B, 416/132 B, 232; 290/44, 45, 55
See application file for complete search history.

(56) References Cited

U.S. PATENT DOCUMENTS

| | | | | |
|---|---|---|---|---|
| 1,501,248 A | * | 7/1924 | Strong | ............................ 416/1 |
| 2,576,487 A | * | 11/1951 | Stanley | ................... 244/134 C |
| 4,056,332 A | * | 11/1977 | Meloni | ...................... 416/97 A |
| 4,581,887 A | | 4/1986 | Scheffler et al. | |
| 4,648,801 A | * | 3/1987 | Wilson | ....................... 416/171 |
| 5,356,265 A | * | 10/1994 | Kercher | ..................... 416/97 R |
| 5,429,877 A | * | 7/1995 | Eylon | ......................... 428/586 |
| 6,145,787 A | | 11/2000 | Rolls | |
| 6,676,122 B1 | * | 1/2004 | Wobben | ....................... 290/55 |

(Continued)

FOREIGN PATENT DOCUMENTS

DE 842 330 6/1952

(Continued)

OTHER PUBLICATIONS

Oliver, A.G. et al., Wind Turbine Blades Equipped With Air-Jet Vortex Generators: Full Scale Verification of Blade Optimised For Increased Performance, European Wind Energy Conference, Oct. 1997, Dublin Castle, Ireland.

*Primary Examiner*—Edward Look
*Assistant Examiner*—Aaron R Eastman
(74) *Attorney, Agent, or Firm*—Cesari and McKenna, LLP; Patricia A. Sheehan

(57) ABSTRACT

A de-icing and anti-icing arrangement for a Wind Energy Converting System (WECS), a WECS comprising a de-icing and anti-icing arrangement and a method for preventing and eliminating ice accretion on the rotor blades of a WECS are provided. The WECS comprises a tower, a rotor having a plurality of blades that rotate due to wind force, a nacelle including a first means for transforming the rotor's rotational movement to electric power, and a second means for permitting the flow of fluid from volumes defined by the rotor blades, the rotor blades comprising an external surface having openings in fluid connection with the volumes inside the blades for permitting the flow of fluid to the outside of the blades to fluid-thermodynamically interact with the wind hitting the part of the blade surface, and thereby prevent or eliminate the accretion of ice on the external surface of the blade.

33 Claims, 9 Drawing Sheets

U.S. PATENT DOCUMENTS

| | | | |
|---|---|---|---|
| 6,749,396 B2 * | 6/2004 | Barry et al. | 415/115 |
| 7,086,834 B2 * | 8/2006 | LeMieux | 416/1 |
| 7,217,091 B2 * | 5/2007 | LeMieux | 416/95 |

FOREIGN PATENT DOCUMENTS

| | | |
|---|---|---|
| DE | 19802574 A1 | 3/1999 |
| DE | 10000370 A1 | 7/2001 |
| EP | 0436243 A2 | 7/1991 |
| EP | 0475658 A1 | 3/1992 |
| WO | WO 01/06121 A1 | 1/2001 |

* cited by examiner

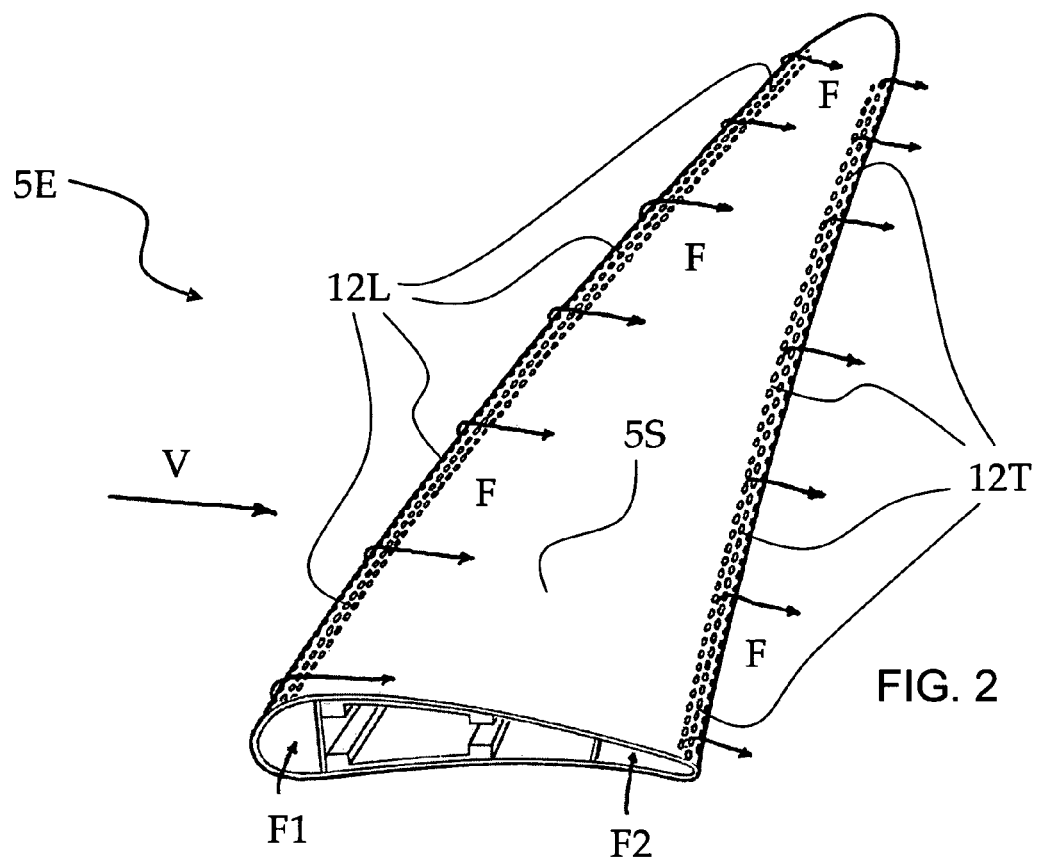
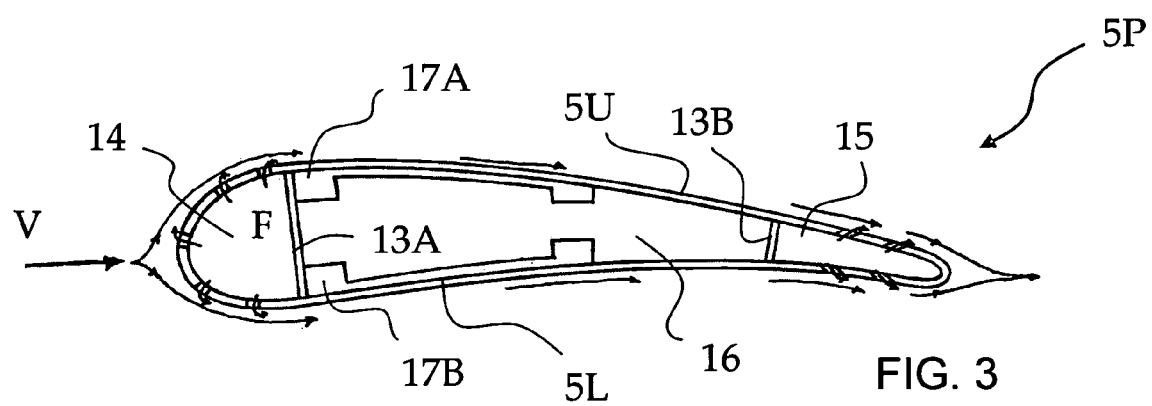

 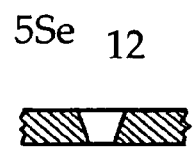 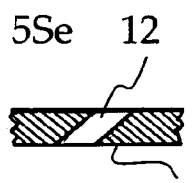
FIG. 4A  FIG. 4B  FIG. 4C
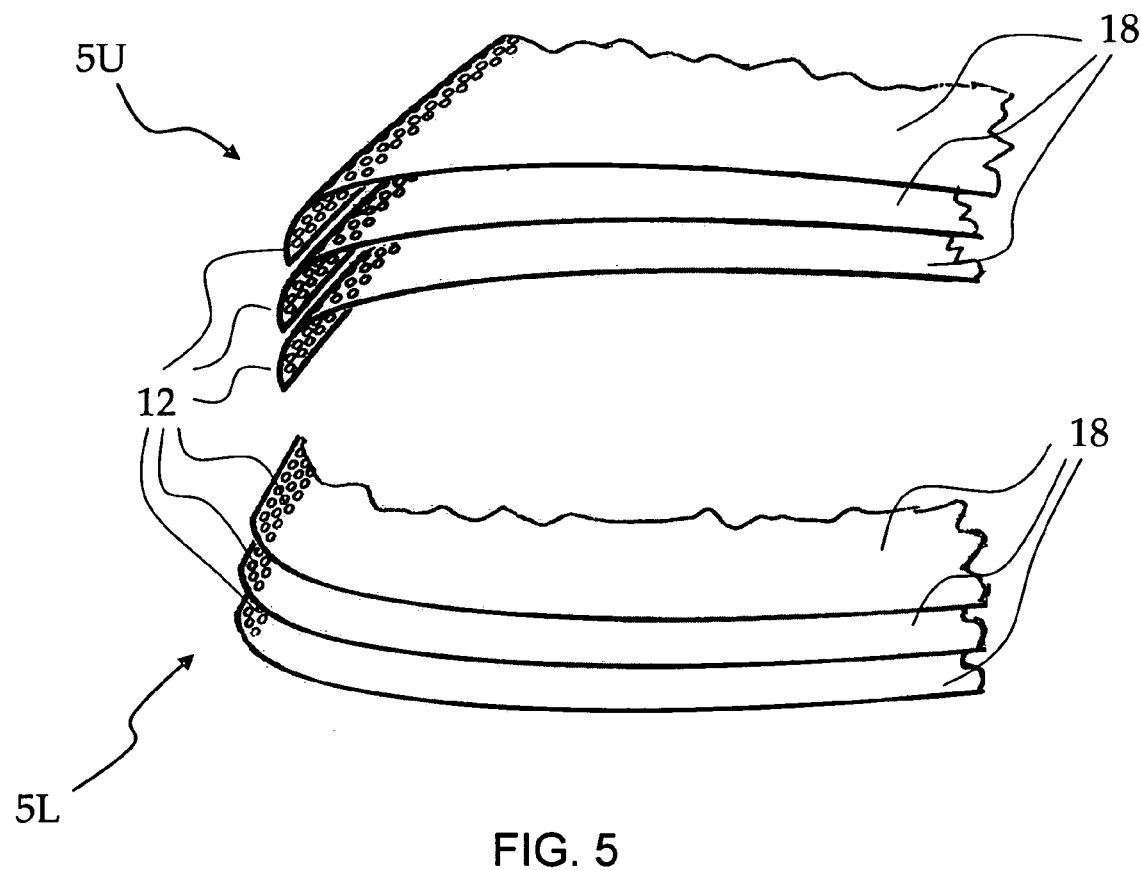
FIG. 5

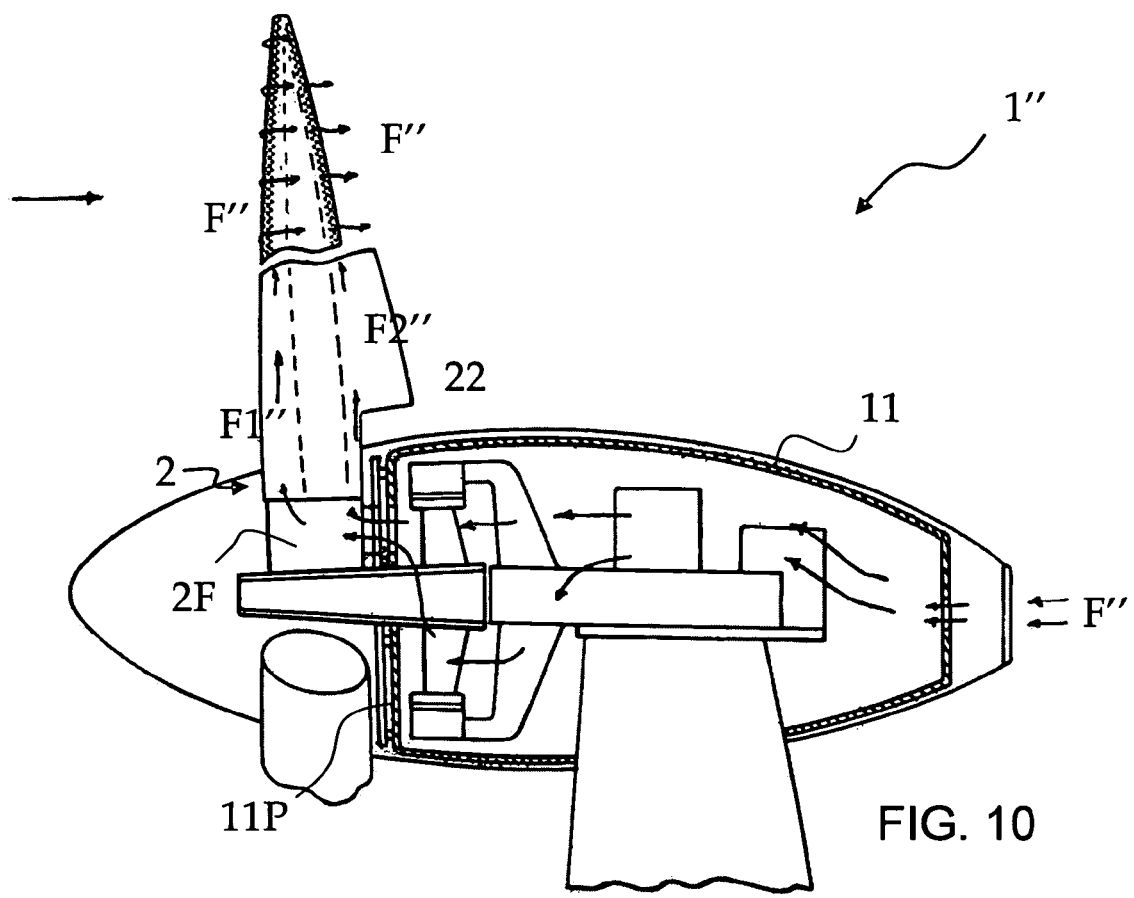
FIG. 10
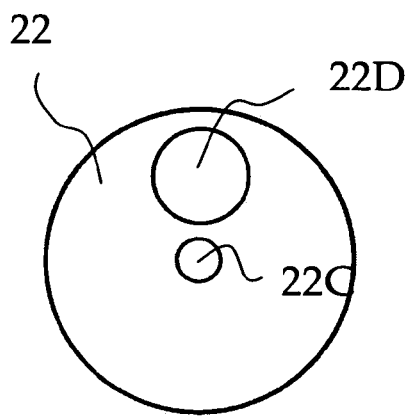
FIG. 11A
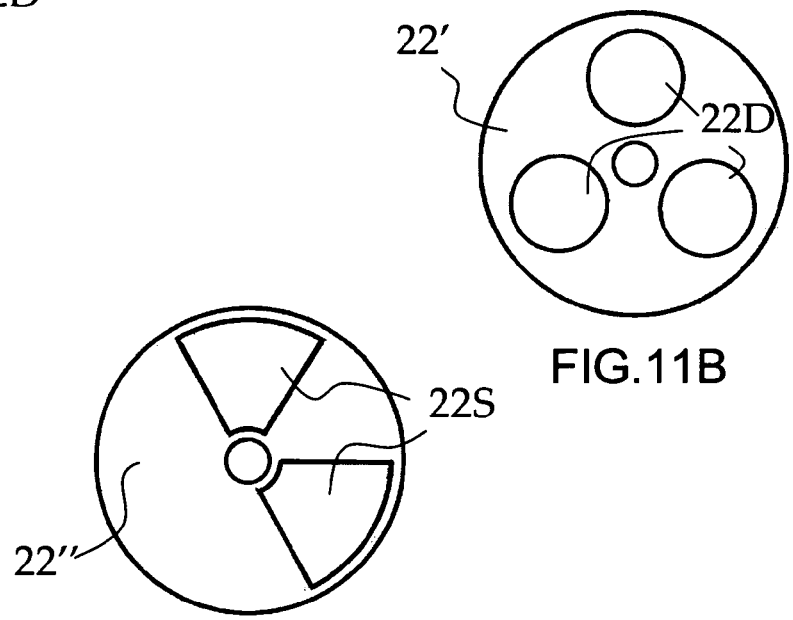
FIG. 11B
FIG. 11C

ANTI-ICING SYSTEM FOR WIND TURBINES

CROSS-REFERENCE TO RELATED APPLICATIONS

The present application claims the benefit of PCT Patent Application Ser. No. PCT/IB03/04551, which was filed on Oct. 16, 2003, of common title and inventor-ship and is hereby incorporated by reference.

BACKGROUND OF THE INVENTION

1. Field of the Invention

The present invention relates to a de-icing and anti-icing arrangement for a Wind Energy Converting System (WECS), a Wind Energy Converting Systems (WECS) comprising a de-icing and anti-icing arrangement and a method for preventing and avoiding the ice accretion on the rotor blades of wind turbines in a Wind Energy Converting Systems (WECS). More particularly, what is provided is a system for preventing and/or eliminating ice accretion on the rotor blades of a WECS when the system operates in determined climatic and environmental conditions.

2. Background Information

Ice accretion on the profile of a wing, and more specifically on a wind turbine rotor blade, seriously affects its fluid-dynamic characteristics. In particular, ice accretion affects the lift and the drag of both the blade and the overall structure, and thus, remarkably changes the pressure distribution along the relevant surfaces. Often it is very difficult to foresee how factors such as lift, drag and pressure will change depending on the deposit of ice on those surfaces. In instances of ice accretion, consequently, the blade in operation undergoes different flexion and torsion stresses, which typically result in a remarkable decrease in the overall aerodynamic efficiency of the wind turbine.

The power generated by the WECS rotor when ice is present on the rotor blades is much less than that generated without icing. In addition, ice accretion also affects the blade, due to the increased and different masses distribution caused by the ice, such that it completely modifies the static and dynamic behavior of the blade.

Moreover, in ice accretion conditions a significant problem arises relating to the WECS safety, both as it relates to the safety of people or property near to the system, and to the possibility of system failure or breakdown. In fact, in situations where the turbine is in operation and the blades are functioning and have ice on their surfaces, it may happen, in a fully unforeseen manner, that ice pieces come off from the blades.

In such situations, the following are possible results:

1) objects or people around the system are hit by pieces of flying ice; and 2) suddenly and unforeseeable structural stresses are generated, essentially of an aeroelastic nature.

In the first instance, due to the dimensions of current generation WECS, where the rotors may extend to be ninety meters in diameter and the towers may reach one hundred meters in height, in conditions where ice comes off the blades in sudden and unforeseeable fashion, the pieces of ice become projectiles, taking off like bullets from the blades, and having the capacity to cause remarkable damage to the surrounding environment. The legal and other ramifications of such an occurrence are readily apparent and can easily be appreciated.

The consequences of the second situation are equally significant. When the WECS is in operation, vibrations of aeroelastic nature can generate significant structural stress both on a single blade of the system and on the system as a whole. Structural resonance phenomena may occur with the failure of one or more blades (i.e., an unforeseeable "flutter" phenomena in the pressure distribution on the blade surface may be very different from the designed one) as well as of the system as a whole (i.e., bridge breakdowns at the beginning of the twentieth century due to wind gusts are well known).

For many of the foregoing reasons, WECS operations are typically stopped when the presence of ice on the blades is detected. The duration of such stops varies depending on the seriousness of the problem. In instances where ice cannot be adequately removed by means of available de-icing devices, WECS systems are only used during a limited number of days per year, particularly when that are installed in areas where ice formation is common. In such areas, existing estimations indicate that an electric power loss of about the 20-50% is experienced vis-à-vis the amount of electric power produced annually in areas where a WECS is continuously working.

Several solutions for solving the of ice accretion on WECS blades are known in the art. These systems generally adhere to the following three operation principles:

I) utilizing a heat absorbing blade surface lining that gathers heat from the thermal sun radiation;

II) localized heating of the blade surfaces affected by the ice formation;

III) circulating heated air inside the blade body, and using internal heat conduction means to transmit heat to the outer blade surfaces affected by ice accretion.

Type I systems are only effective in presence of sun, and therefore only during the day and with climatic conditions of good sun radiation. As night time is the most critical period for ice accretion, however, these systems are the least effective at the time when they are most needed.

Type II systems generally use sheets of electrically resistive or thermo-conductive material, embedded inside the blade surface and heated for Joule effect. Such sheets are electrically heated and during the construction represent additional and electrically conductive masses applied to the shallow layers of the blade, specifically in the icing prone areas.

Type II systems prevent ice accretion during WECS operation and eliminate ice formed on the blades during a system stop. However these systems have drawbacks such that they are typically used only in research or educational applications.

More specifically, Type II systems use a complicated ice accretion control and management mechanism. This mechanism includes ice locating sensors, and control and management processing software for providing an electric power supply to the area where there is the danger of ice accretion. The complexity, cost, reliability and maintenance problems of Type II systems, consequently, are remarkable in the long run.

Moreover, the electric power necessary to heat a Type II system by means of the Joule effect may represent a significant share of the total power output of the WECS, and in specific conditions, a Type II system may even absorb as much electric power as it produces. In such cases, the actual efficiency of the system is drastically reduced, and provides a rather unsatisfactory yield in critical operating conditions.

A further drawback of the Type II system is that when idle, that is, when the rotor is moving without electric power being produced, the electric power needed to prevent or eliminate the ice accretion has to be taken by the electric grid, and the system is unprofitable in these conditions.

The thermo-conducting sheets that are glued to the blade surface of the Type II system also wear out very easily, thus they often require maintenance work and reduce the availability of these systems. The sheets are made of a substantially metallic material and can attract atmospheric lightning. Lightning can seriously damage the de-icing and anti-icing arrangement as well as the electric devices associated with the system and, in some cases, cause failure of the rotor on which the lightning discharges.

In addition, once the thermo-conducting sheets are electrically powered, they generate very strong electrostatic rotary fields, and create pollution and undesired electromagnetic noise effects around the WECS.

Another significant disadvantage of Type II systems is that any guarantee given by the manufacturer of the wind turbine is lost once a de-icing and anti-icing arrangement is incorporated onto or within in the blade structure.

Furthermore, as it has been experimentally verified, in determined environmental and climatic conditions, ice may build up anywhere on the blade surface, and thus the blade should be almost entirely covered by thermo-conducting sheets.

The consequent manufacturing and maintenance costs reach prohibitive levels, which, together with a not certainly high total efficiency of a Type II system, thus make it decidedly unprofitable.

Type III systems are devices that circulate heated air inside the blade body, apt to heat up it and also the external surface by means of thermal conduction through the material which constitutes the blade body. One example of a Type III system is provided in German Patent No DE 196 21 485.

In the German patent, a recirculation of the internal air has been adopted for each blade, controlled by a fan, and the air is heated by means of electric resistances. All the components are located in the hub of the rotor. In particular, there are two pipes, which channel the heated air in the leading section of the blade, while a pipe is apt to extract it from the rear section of the blade in order to allow the internal recirculation of the air.

The device includes small output holes on the far end of the blade, in order to avoid the collection condensed water where the stream is colder being more distant from the heat generator. However, in fact, the far end of the blade is the point where the ice accretion is more likely. In order to bring as much heat as possible to the end, a continuous support of thermally conducting material, e.g. aluminum is provided inside the blade, close to the leading edge. This creates a thermal bridge for the heating, as the rotor blade is generally made of composite material with reduced thermal conductivity, for instance resin-glass.

Such a Type III system includes at least the following drawbacks. The first is that the actual dimensions of the blades, which may reach in some points 60 mm, require a large amount of thermal energy to power the circulating air inside the blade and effectively heat up the whole blade body as well as the relevant external surface. Assuming that it is possible to attain such a level of power, the wind turbine equipped with such a system, will nonetheless still show a very low efficiency when there is the danger of icing. This because, it is necessary to heat up the whole blade mass in order to heat up the surface of the blade, and thus the amount of electric power to be transformed into heat is actually remarkable.

The use of fans inside rotating elements of such Type III systems is known to be highly discouraged by fan manufacturers as well as there is a high probability of malfunction and breakdown due to the effect of Coriolis forces on the rotating parts of the fan.

In summary, the invention of the German patent of forced air circulation may be actually carried out only when the system is stopped, with all the resulting logistic limits that are easily foreseeable.

German documents DE 842 330 and DE 198 02 574 illustrate Type III systems wherein each wind turbine blade includes an opening on an airfoil, located at the end part of the blade span, and an air stream flows into the blades and is warmed by over lapping electric current generators/motor parts.

The openings in the airfoil blade are laid out and designed to allow the warmed air stream inside the blade to continuously flowing into the blade for centrifugal effects, so exchanging heat to the blade inner parts heats the blade.

German Utility Model No DE 200 14 238 U1 illustrates a device where air is circulated inside the blade body and heated up by the waste heat given off from electric devices contained in the nacelle of the wind turbine. A ventilation system which operates with the rotor is also employed, as the fan for the forced air circulation is located in the nacelle of the arrangement. A continuous heated air distribution system is also provided inside each of the blades.

This model has the disadvantage that it is rather complicated and difficult to carry out because it uses intermediate fluids for realizing the thermal exchange between the waste heat of the electric devices and the circulating air inside the blade.

Moreover it has also the same drawback discussed with respect to the German patent, i.e. that the remarkable thickness of the blade, constituted by poor conducting materials, do not guarantee an effective and efficient heating of the surfaces of the blades.

Furthermore, the heat supplied by means of the forced circulation of the fluid stream inside the electric devices is certainly not sufficient for avoiding the problem of the ice accretion in particularly critic environmental conditions. To this we always have to add a consistent amount of heat, typically obtained by means of the Joule effect.

To be underlined is certainly the poor material thermal conductivity constituting the blade, which remarkably jeopardizes the effective heat exchange between the fluid stream and the blade body. In synthesis, even complicating the construction of the blade with the insertion of thermally conductive metallic parts, which shall reach the far end of it, the arrangement appears of poor effectiveness. The efficacy increases if a great amount of electric power is taken from the electric grid in order to heat up the blade bodies of the wind turbines, with the disadvantage of having a poor total efficiency of the WECS in critic operating conditions.

Summing up, it is indeed the type of heat transmission chosen, namely the heat internal convection from the blade body to the outside surface, which represents the main limit for the de-icing and anti-icing effectiveness. This method of heating, in fact, leads to the use of large amounts of thermal power for the desired purpose, and to not being able to send heat only to the particular surface areas of the blade concerned by ice. More specifically, the tip area of the blade, which is the most affected by ice accretion, is the exact area where the internal airflow arrives with the lowest temperature, having already expended its heat to the areas closest to the root of the blade.

SUMMARY OF THE INVENTION

The present invention solves the drawbacks of the devices known art by providing a de-icing and anti-icing arrangement, which can be used in Wind Energy Converting Systems.

It is an object of the present invention to provide a simple and reliable de-icing and anti-icing arrangement, which needs less maintenance work and shows reduced realization and implementation costs.

It is another object of the present invention to decisively increase the number of the days in a year in which the WECS can continuously work. More particularly, it is an object of the present invention to provide a de-icing and anti-icing arrangement to eliminate stops exclusively due to the danger of icing, or actual ice accretion on the blades.

It is an object of the present invention to provide a highly efficient WECS, which can operate particularly in critic times for ice accretion, without the need for stopping it.

Another object of the present invention is to provide anti-icing properties to the WECS even when the rotor is idle, i.e. with the electric generator not producing electric power, thereby avoiding the use of an external electric power source, i.e., taking electric power taken from the electric grid.

A further object of the present invention is to facilitate the maintenance work for individual rotor blades, and in particular, the cleaning of blade surfaces. In fact a problem in connection with wind turbine operation is the sediment of organic and inorganic residues in the fluid stream hitting the blade. These residues accumulate particularly on areas corresponding to the edge of the blade profile and modify the fluid dynamic characteristics thereof.

It is an object of the present invention to reduce the level of sound emission due to the rotation of the wind turbine blades.

Another object of the present invention is to avoid or reduce the accretion and accumulation of solid sediments on the blades.

To achieve these objectives, the present invention provides a de-icing and anti-icing arrangement, a WECS comprising a de-icing and anti-icing arrangement and a method for preventing and eliminating ice accretion on the rotor blades of wind turbines in a WECS, having the characteristics of the attached claims, which are an integral part of the present description. The icing and anti-icing arrangement and the corresponding method exploit a solution idea which is completely novel in the field of the WECS.

BRIEF DESCRIPTION OF THE DRAWINGS

Further objects, characteristics and advantages of the present invention will be clear from the following detailed description and the attached drawings, which are provided as explanatory and non limiting examples, wherein

FIG. 2 is a prospect view of a part of the system of FIG. 1, in particular a part of a blade of the wind turbine;

FIG. 3 is a bi-dimensional section of the detail of FIG. 2;

FIG. 4 is sectional views of possible embodiments of a part of the detail of FIG. 2;

FIG. 5 is a schematic showing a method for realizing the detail of FIG. 2;

FIG. 10 and FIG. 14 respectively show a second and a third variant of a possible configuration of the WECS according to the invention, in a schematic partially sectional view;

FIG. 11 is a front view of a few possible embodiments of a detail of the of the WECS of FIG. 10;

DETAILED DESCRIPTION OF AN ILLUSTRATIVE EMBODIMENT

Figure 1:
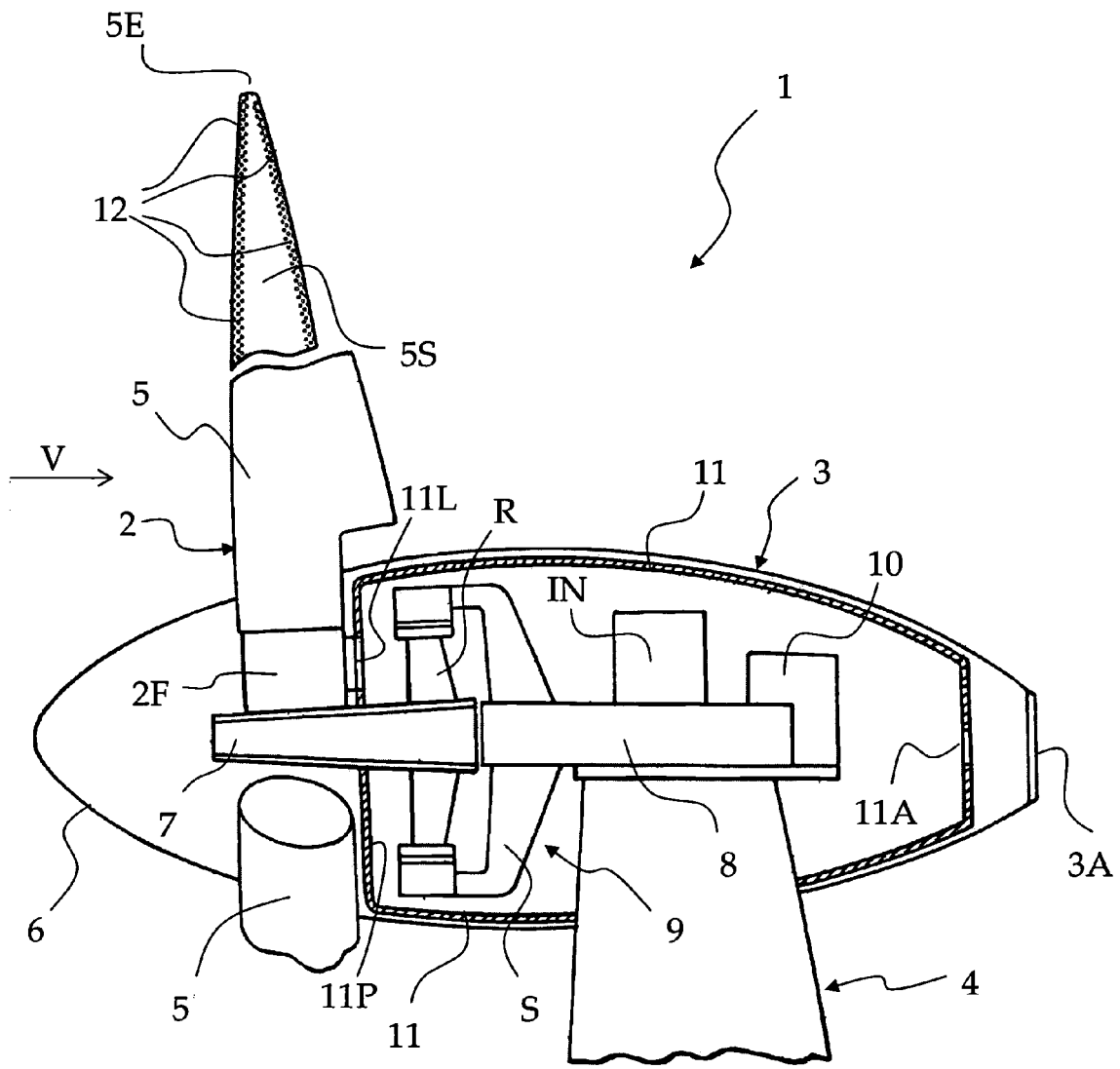
FIG. 1 is a lateral schematic and partially sectional view of a wind turbine in a WECS according to the present invention.

In FIG. 1 there is schematically shown a WECS for generating electric power, indicated as a whole with 1, hit by a fluid stream or wind, as indicated by the arrow V. The system comprises a rotor, indicated as a whole with 2, a nacelle 3 and a tower 4. The tower 4 is set in the ground or in the bottom where the installation of the system 1 is designed. The nacelle 3 is located on the tower 4 and is oriented depending on the characteristics of the wind by means of known devices and arrangements, which are not shown for the sake of simplicity.

The rotor 2 is characterized by the fact of having at its center a hub 2F, apt to be fitted to a rotating shaft 7 of a wind turbine of the WECS 1. The hub 2F carries adaptors or "extenders" 2E rigidly connected to its structure. The adaptors 2E are designed for the bolting, inside them, of each one of the blades 5 of the rotor 2, and can be seen in FIGS. 7 and 12. The rotor 2 of the shown example has three blades 5, which are substantially identical one each other. Associated to the rotor 2, on the front part of the nacelle 3, there is a fairing or spinner 6 apt to perform both aerodynamic and structural functions. Inside the nacelle 3, and more precisely in a capsule 11, the characteristics of which will be better described in the following, includes all the components apt to transform the rotational motion of rotor 2 in electric power, in particular alternating current for supplying an electric grid connected to the WECS 1.

In the said explanatory and not limiting example of the present invention, we can notice, schematically represented in FIG. 1 and fitted in a known manner to a shaft 7, from the outside to the inside respectively, the rotor 2 and the rotating part R of an electric synchronous motor 9. The shaft 7 rotates with respect to a fixed support 8 of the nacelle 3 of the wind turbine of the WECS 1. On such support 8 the static part S of the electric motor 9 is in turn fixed, which faces toward the rotating part R, in a known manner for allowing the production of electric current when the rotating part R is in motion and the synchronous electric motor 9 is under current. The generated current is sent to an electric intermediate circuit or inverter IN and then forwarded to the electric grid, with the suitable frequency and the designed voltage.

Inside the nacelle 3 there is a further an electric unit 10, electrically connected to the inverter IN and/or to the electric grid, comprising the auxiliary power systems apt to supply all the electro-mechanic devices necessary for the operation of the parts of the WECS 1. Such parts are, for instance, the small electric motor which controls the nacelle sub-distribution system, i.e. the inclination or "pitch" of the blades 5 of the rotor 2 with dependence on the characteristics of the wind, rather than an anemometer for measuring the intensity and the direction of the wind, rather than a computer controlling the operation of the devices and many other known electric arrangements not represented for the sake of simplicity.

The capsule 11, fixed to the nacelle 3, is substantially closed and is made of a material with poor thermal conduction characteristics, i.e., a composite material of the resin-glass type. In this way an accumulation volume for the air circulating inside the wind turbine of the WECS 1 is identified. The air, thermally insulated from the external environment, and is heated up by coming in contact with the heated parts of the electric devices 9, 10, IN present inside the capsule 11.

The capsule 11 includes on the rear one or more openings 11A, with connection of fluid to the outside for the air inlet inside the capsule 11 through one or more openings 3A located on the rear of the nacelle 3. Frontally there are one or more passing windows 11L obtained in a front wall 11P, which allow air which is taken in through the openings 11A of the capsule 11 to pass from the accumulation volume to the hub 2F of the rotor 2.

FIG. 1 further illustrates the tip part 5E of the blade 5, showing on its surface 5S some openings or holes 12 in communication with the inside of the blade 5. The blade 5 can be seen in particular detail in FIGS. 2 and 3, where there are illustrated respectively a prospect view of the tip part 5E, hit by the wind V, and a cross section 5P or profile of the blade 5.

The holes or openings 12 may be of circular, elliptic or any other section. The holes 12 may also have equal or different shape depending on the surface 5S area whereon they are located, their characteristics are chosen according to specific studies and numerical-experimental investigations.

FIG. 2 shows the tip part 5E of the blade 5, the surface 5S thereof having a first series of openings or holes 12 near to its leading edge, and a second series of holes 12T near to the trailing edge. The edges are referred to each one blade 5 profiles relating to the cross sections 5P along the longitudinal progress of the blade 5. Arrows F indicate the airflow through the surface 5S openings or holes 12.

The tip part 5E is internally divided by two bulkheads 13A and 13B, as illustrated is in FIG. 3, substantially identifying three volumes: a first volume 14 corresponding with a first series 12L of holes 12, a second volume 15 corresponding with a second series 12T of holes 12, and a third volume 16, which is comprised between the other two, namely corresponding with the middle part of the profiles. Inside the third volume 16 there are located two girders 17A and 17B, which having a supporting function, which are associated to the blade 5 surface 5S according to known technique. The surface 5S of each blade 5 comprises two semi-shells 5U and 5L, respectively an upper and the lower shell, generally made of composite material like resin-glass.

In FIG. 4 three different possible holes 12 architectures are provided on the blade surface 5S:

1) a first type shown in the view 4a, where the hole 12 has a constant section for the air flowing from the inside surface 5Si to the external surface 5Se of the blade 5;
2) a second type shown in the view 4b, where the hole 12 is divergent and showing a substantially orthogonal shaft with respect to the direction of the current V outside the blade 5, as in case 1);
3) a third type shown in the view 4c, instead showing a hole 12 with substantially parallel walls and inclined shaft, forming a determined acute angle with respect to the shaft orthogonal to the outside surface, with such an orientation that the out-flowing air has a direction following the external current V direction.

In FIGS. 2 and 3 there is also shown the behavior of the airflows circulating in the blade when the de-icing and anti-icing arrangement according to the present invention is operating. This behavior is better explained in the following description. There is an air-flow entering the first volume 14 indicated in FIG. 2 with arrow F1, and an airflow in the second volume 15 indicated with arrow F2. Both airflows F1 and F2 move from the root to the tip of each blade 5. With F it is then pointed the fluid flow circulating inside the wind turbine of WECS 1, which just arriving to the surface 5S flows out from the holes 12 forming a fluid film, as better specified in the following.

In FIG. 3, F identifies the air inside the blade 5 flowing out from the holes 12, mixing to the outside fluid current V.

Figure 6A:
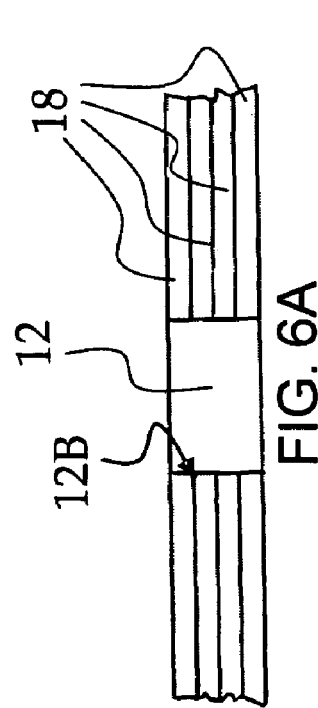
FIG. 6 shows the detail of FIG. 4.
Figure 6B:
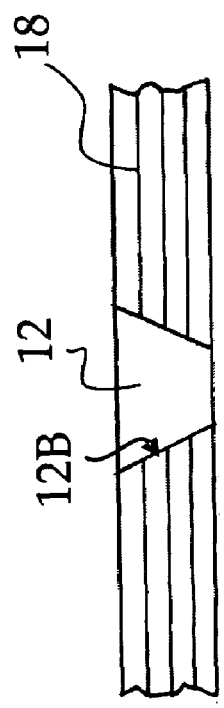
Figure 6C:
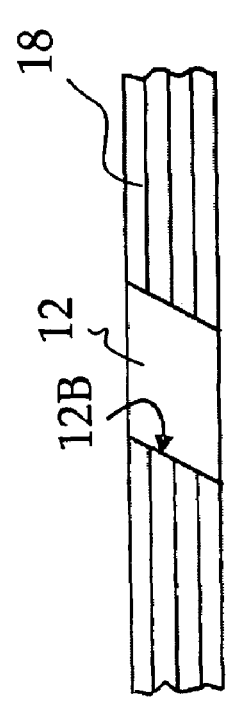

FIGS. 5 and 6 illustrate a configuration of two semi-shells 5U and 5L forming the outside shell, namely the outside surface 5S of each blade 5. In particular, the semi-shells 5U and 5L are configured by overlapping a number of composite fiber sheets 18, where inside the holes or openings 12 are already formed. In this way the problem of the composite fibre weakening due to a mechanical drilling aimed to obtain the holes 12 is overcome. The sheets 18 are joined by means of gluing or other known methods of making the semi-shells 5U and 5L, and are assembled together and to the bearing blade 5 structure by known technical methods, herein being not described for sake of simplicity.

FIG. 6 shows, in the views 6a-6c, the sheets 18 arrangement and conformation in proximity to each one of the holes 12. Sheets 18 include borders 12B, adapted to individuate the passage for constituting each hole 12, already fabricated to be in line with each one of the holes 12 shaft present on the blade 5 surface 5S. Views 6a, 6b, 6c correspond to views 4a, 4b, 4c of the types of holes 12 previously discussed.

Figure 7:
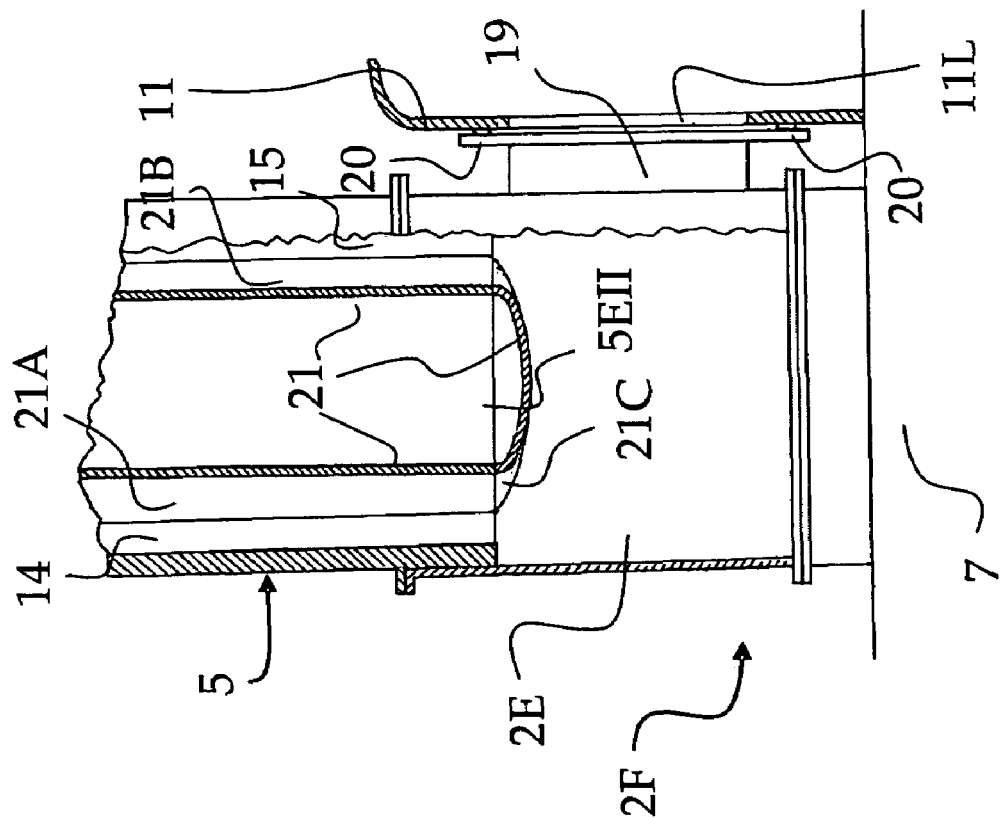
FIG. 7 and FIG. 12 show a lateral and partially sectional view and a schematic view, respectively, of a second detail of the wind turbine of FIG. 1 and a variant thereof.

FIG. 7 shows the detail of the rotor hub 2F, in the location where the blade 5 is inserted into the hub 2F, in a partially sectioned assembled view according to a broken plane passing through the middle plane of the blade 5. Also shown is the detail of the extender 2E, which is substantially cylindrically shaped, and includes on the lateral side a mouth 19 facing toward the capsule 11 of the nacelle 3. The hub 2F is made in the manner that it presents a circular ring in correspondence of the capsule 11 window 11L, the ring is interrupted by mouths 19 in correspondence of each one of the rotor 2 blades 5. Holding elements 20 are provided between the mouth 19 and the capsule 11, which allows the fluid flow through the window 11L to the capsule 11, and the inside part of the extender 2E. The holding elements 20 allow the air flow from the capsule 11 to the mouth 19 and then inside the extender 2E without any external leakage, even if the rotor 2 is in movement, i.e. when the wind turbine of WECS 1 is working. The blade root 5R engages one of the bases of the cylinder forming the extender 2E.

FIG. 7 is a sectional view which illustrates an assembly of the internal baffles 21 which are adapted to deviate the inner airflow coming from the capsule 11 and the hub 2F. In particular, inside the blade 5 there is a first baffle 21A defining the first volume 14 inside the blade 5, which is connected to the first bulkhead 13A of the blade tip 5E. The second baffle 21B is similarly joined to the second bulkhead 13B and defines the second volume 15 inside the blade 5.

A third baffle 21C, joined to baffles 21A and 21B is also provided in the extender 2E so as to form, once assembled the blade 5 to the extender 2E, only one inner baffle 21 for baffling the airflow circulation inside the two volumes 14 and 15.

Figure 8:
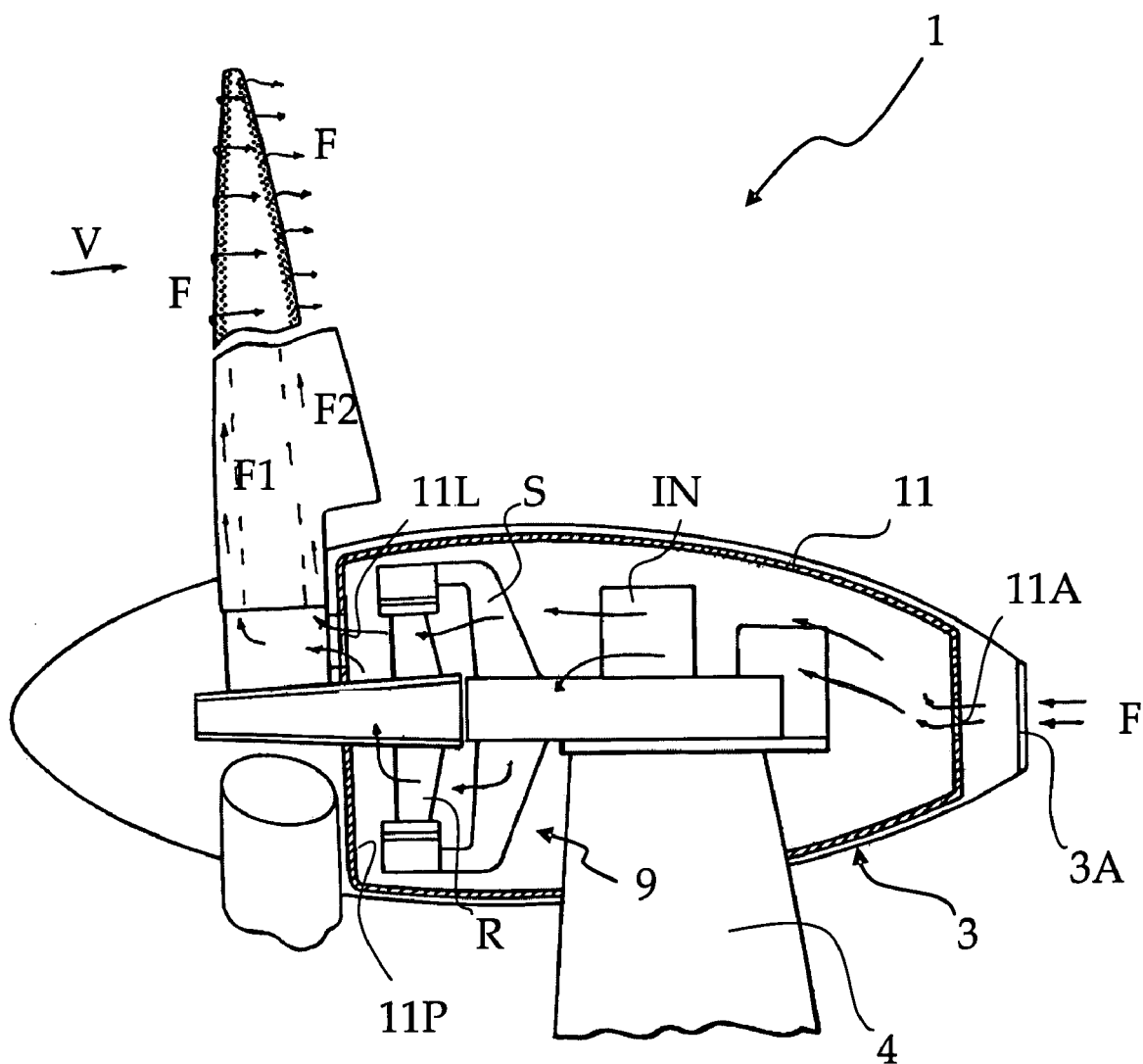
FIG. 8 explains the same view of FIG. 1 comprising operational details of the behavior of the airflows of the WECS.

FIG. 8 illustrates airflow F circulation in the wind turbine of the WBCS 1, which constitutes the means for realizing the de-icing and anti-icing effect according to the present invention, with modalities as explained further below.

Airflow path F circulating in the wind turbine of the WECS 1 with the rotor 2 in operation is described as follows.

Airflow F flows in from the opening 3A of the nacelle 3 and, through the opening 11A of the capsule 11, and arrives in the accumulation volume defined by the internal space of the capsule 11. Here the airflow laps on the electric unit 10, the inverter IN and, moves through the static part holes S, the electric motor 9 rotating part R. From here, through the window 11L, airflow F reaches the rotor hub 2F and then the inner part of the blade 5, namely the first and the second volume 14 and 15. Inside the rotor hub 2F, in fact, the flow F is deflected due to the presence of the baffles 21 (see FIG. 7), going inside the tip part SE of each blade 5, with the bulkheads 13A and 13B as identified in FIGS. 2 and 3. In this way, two separate airflows F1 and F2 are generated inside each one of the blades 5, going respectively from the root to the tip of the blade 5, one in the first volume 14 and the other in the second volume 15, until flowing out through the first series 12L and the second series 12T of holes 12 present on the surface 5S of each one of the blades 5.

Airflow F is substantially created by the global pressure differences generated between the internal and the external flows, considering the rotor 2 turning motion and the relevant kinetic effects, according to the known modalities.

With reference to FIGS. 2, 3 and 4, airflow F flowing out from the holes or openings 12 interacts with the wind V hitting on the 5 and creates a air layer or film upon the blade 5 outside surface 5E concerned with the holes 12, namely downstream of it. The air film, due to known thermal and dynamic effects, deflects the fluid stream of the wind V from the direct impact with the outside blade 5 surface 5S, so heating the stream and preventing that wind V humidity particles from condensing and making ice.

This outflow from the holes 12 prevents the direct impact of the wind V with the surface 5S not only of the humidity particles, but of any relatively small mass with respect to the air outflow mass. For instance, the small insects which plentifully accumulate on the wind turbine rotor blades are baffled, obliging the system to be periodically stopped for removing them.

The holes or openings 12 are made in vicinity of the leading edge and the trailing edge of each blade 5 profile 5P, as these are the points where the blade temperature is the lowest and the fluid stream pressure of the wind V applying to the surfaces 5S the highest, and therefore the greatest is the risk of ice particles accretion. While one example of the arrangement of holes 12 arrangement is shown in this example, it will be appreciated that different arrangements are foreseeable including, for example, channeling the air inside a third volume 16 (see FIG. 3).

In order to better prevent the icing danger, it may be preferable to create a fluid airflow F uniformly flowing out from the holes 12 not only along the entire profile 5P, but along the entire outside surface 5S of each blade 5 concerned by the holes 12. For this, the air shall have the suitable enthalpy content, and the holes and the conduits be sized for giving to the airflow F the suitable values of mass, pressure, direction, verse and intensity with reference to the outflow velocity from the holes 12. To this purpose the holes 12 are dimensioned, for example, as shown in the examples provided in FIG. 4.

More particularly, the hole 12 of FIG. 4a allows an airflow F which is orthogonal to the wind V. The hole of the FIG. 4b allows a pressure recovery and therefore a slowing down of the outflow speed. The hole of FIG. 4c can actually contribute to energizing the fluid stream of the wind V hitting each profile 5P. Such energizing process, as known from the aeronautical literature, may improve the global aerodynamic performances of the blade 5 and therefore the aerodynamic efficiency, so increasing the global performance of the WECS 1, namely a greater power to be obtained on the wind turbine main bearings. In fact, with the proper enthalpy content concerning the air circulating inside the WECS 1, the airflow F can reach such an aim having a determined angle with respect to the direction of the fluid stream of the wind V hitting the surface 5S of each one of the blades 5.

Summing up, the present invention comprises in a de-icing and anti-icing arrangement implemented in a WECS, which exploits the fluid thermo-dynamic effects of the fluid air outflow on at least a portion of the wind turbine rotor blade, which in turn has an enthalpy content certainly greater than the wind which moves the wind turbine. Moreover such a system, in order to increase the enthalpy content of the fluid air outflowing, exploits the same heat coming from the electrical devices present in the generator, that necessarily dissipate during their operation.

In fact the behavior of the airflow F in the described WECS 1 can show two clearly different operating conditions, and namely:

1) with the rotor R connected, and therefore with electric power generation and heat dissipation coming from all the electric devices present in the capsule 11 of the WECS 1;

2) With the rotor R of the electric motor 9 idle, and therefore without electric power generation and heat dissipation.

In the first situation, air taken from the environment surrounding the WECS, with pressure substantially equal to the ambient pressure, heats up in the accumulation volume coming in contact with the electric devices 9, 10, IN present in the capsule 11 before flowing out from such a volume, i.e. from the capsule 11. Moreover, the air loses humidity and condenses by coming in contact with the walls of all the elements of the WECS 1. Therefore, airflow F flows out from the holes 12 at a higher temperature and with greater pressure with respect to the fluid stream of the wind V hitting the blade surface 5S, and with a remarkably lower humidity degree.

The second situation differs from the first only in that there is a lack of a significant thermal exchange between the airflow F and the electric devices 9, 10, IN. The anti-icing effect is otherwise unchanged in the remainder of the described phenomena.

It will be appreciated that airflow F flowing out from holes 12 interacts fluid thermo-dynamically not only with the fluid stream of the wind (V) hitting the outside surface 5S concerned with the openings 12, but with any other fluid or solid which is possibly present on the outside surface 5S of the blade 5, like water or ice. The WBCS 1 wind turbine could in fact be in operation with a heavy rain, or with some ice which has been formed previously.

It will also be appreciated that the airflow F in the de-icing and anti-icing arrangement, pulsates at least in the passage between the accumulation volume, i.e., the capsule 11 and the hub 2F, and from here to inside the root 5R of the blade 5.

The airflow F in fact does not pass with continuity from the window 11L of the capsule 11 and the hub 2F mouth 19, because the mouths 19 are located only in correspondence of each one of the blades 5. Therefore airflow F drawn inside each blade 5 each time that the relevant mouth 19 is connected to the window 11L. Each blade is so supplied intermittently on every rotation and during a determined angular excursion of the rotor 2. Such intermittence is variable conforming the front wall 11P of the capsule with several windows 11L located on a circumference, at a height corresponding to that of the mouths 19 of the hub 2F. At the best said windows 11L could form a substantially continuous circular ring.

This intermittence guarantees that airflow F remains in the accumulation volume a longer time, and thus may acquire greater enthalpy at the entry of the root 5R of each blade 5.

In view of the foregoing detailed description as well as the operation of the representative and the illustrative, not limiting example of the present invention, the following advantages of the de-icing and anti-icing arrangement of the present invention are clear.

The de-icing and anti-icing arrangement is simple and reliable, and does not need any control system once its various parts have been suitably dimensioned, thereby reducing realization and implementation costs with respect to the known systems, which however are less effective.

Moreover, the de-icing and anti-icing arrangement of the present invention is intrinsically safe operating, due to its simplicity and the lack of management and control systems which lead to the risk of malfunctions.

Another advantage of the de-icing and anti-icing arrangement of the present invention is that of assuring a high efficiency of the WECS, and avoiding stops even in operating conditions which are particularly critical for the ice accretion. That is, the number of days of a year in which the WECS can operate continuously is remarkably increased with respect to what happens with the systems using the known solutions.

The effectiveness of the de-icing and anti-icing arrangement is due to the thermal and fluid-dynamic effects generated by the fluid flowing out from the holes. The thermal effect is essentially due to the formation of a boundary thermal layer with increased enthalpy where the drops absorb heat for partially or totally vaporizing, so avoiding the ice accretion on the surface of the blade. The fluid-dynamic effect consists in the deviation which the air film induces on the drops of water and the hitting particles of various nature (i.e., insects, sand). This effect is maximum at certain speed and grain size.

Another advantage of the de-icing and anti-icing arrangement is that it is effective even if the rotor is idle, or when the generator does not generate electric power. The system in effect does not need electric power to correctly operate, and therefore does not need to draw current from the electric grid, unlike some known solutions.

Another advantage is that the de-icing and anti-icing arrangement of the present invention reduces both the number and the duration of the stops of the system due to the need of removing the solid residues from the rotor blades.

Furthermore the system does not alter the structural strength of the blades, and/or void any manufacturer warranty for the rotor blades.

Another advantage of the present is that invention relates to the interaction between the fluid stream flowing out from the holes of the rotor blade and the main stream hitting it operate to reduce the noise produced by the rotating blades.

Another advantage is that substantially all the heat dissipated by the electric power devices present in the WECS for increasing the enthalpy contents of the circulating fluid producing the de-icing and anti-icing effect is exploited. In other words, when the rotor is idle, almost all the power not collected from the main bearings of the WECS wind turbine/s and from the electric grid is recovered for de-icing and anti-icing purposes.

It will be appreciated that that alternative embodiments of the de-icing and anti-icing arrangement for a WECS of the present invention are possible for the skilled in the art, without exiting from the novelty principles of the inventive idea; it is also clear that in the practical implementation the shape of the described details can be different, and the details could be replaced by technically equivalent elements.

Figure 9:
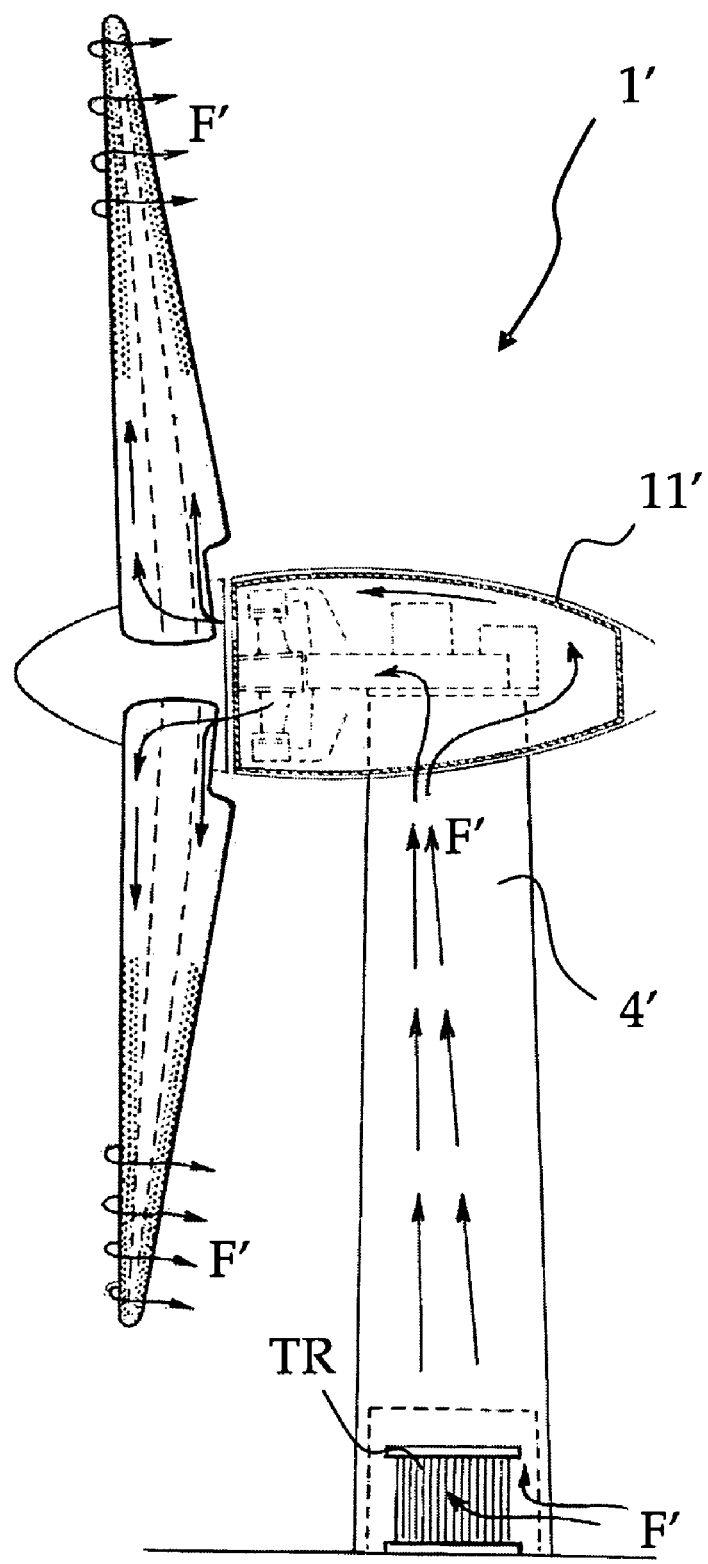
FIG. 9 is a schematic view of the behavior of the relevant airflows of a variant of the entire WECS according to the present invention.

FIG. 9 shows a schematic view of one alternative embodiment of the WECS of the present invention. This embodiment, with respect to the system of FIG. 8, has a slightly different configuration of its parts, apt to establish an internal airflow F' with a slightly modified course shown in the same figure.

In particular, as illustrated in FIG. 9, WECS 1' accommodates an electric transformer TR inside the carrying tower 4', namely in correspondence of the ground in order to not have other considerable suspended masses. Air intakes are provided in the base of the tower 4' near the transformer TR for the entry of the circulating airflow F' inside the WECS 1', so that the intake airflow laps the said transformer TR. Such air intakes are the only ones present in the whole system 1', as the capsule 11' in this alternative embodiment is closed on the rear. In exchange the capsule 11', which still constitutes an accumulation volume for the airflow F', includes openings connecting the fluid with the tower 4' for the passage of the air F from the tower 4' to the inside of the capsule 11'.

Airflow F' is therefore drawn into the base of the tower 4', laps the transformer TR and is channeled up the tower 4', until it flows into the accumulation volume, i.e. the capsule 11'. The remaining path is fully analog to the case of the system of FIG. 1.

In the embodiment shown in FIG. 9 the airflow F, circulating inside the WECS and flowing out from the rotor blades holes, acquires further heat from contact with the transformer TR.

The transformer may be provided with suitable fins in order to allow the passage of the heat to the airflow, as well as all the electric power devices present in the nacelle of the system.

It will be appreciated that current systems are designed with towers reaching also heights greater than one hundred meters. As a consequence the additional path that the airflow F' covers will favor the condensation of the humidity also through the contact with the internal walls of the tower, or possible serpentines and guided paths inside it.

The described embodiment advantageously allows an increase the enthalpy contents of the airflow F destined to implement the fluid thermodynamic effect on the blades of the wind turbines of the WECS, reducing at the same time its humidity grade. In this way the effectiveness of the de-icing and anti-icing arrangement according to the invention is improved, as it is able to withstand even more critic ambient conditions as the possibility of ice accretion on the rotor blades is concerned.

FIG. 10 illustrates another alternative embodiment of the de-icing and anti-icing arrangement, indicated by 1'' in a schematic view, wherein there is further indicated the air-flow F''' constituting the main means for implementing the system.

This embodiment differs from that of FIG. 1 in the area before the capsule 11, between the capsule and the rotor hub 2F of the system 1''. In this area, a movable distributing disc 22 is provided on the shaft 7, facing the front part 11P of the capsule 11. Examples how to conform the distributing disc 22 for obtaining a distribution, and so a different intermittence, of the airflow F''' inside the root 5R of each one of the blades 5 of the rotor 2, are shown in FIG. 11.

The distributing disc 22 is shown inserted between a key hole 22C (in FIG. 11) on the disc 22, and the shaft 7 of the system 1'' whereto it is keyed, a means for changing the angular speed. The means, known as a reduction/ multiplication mechanism and/or small motor, provides variable angular speed of the disc 22 with respect to the shaft 7 whereto is fastened.

FIG. 11 a illustrates an embodiment of distributing disc 22 having only one hole 22D, with a size substantially corresponding to that of the mouth 19 of the hub 2F of the rotor 2 whereto it is faced. FIG. 11b illustrates another distributing disc 22' having three holes, each hole 22D having the same characteristics of the single hole 22D of the disc 22. FIG. 11c illustrates a distributing disc 22" having identical openings 22S shaped as circular sectors, asymmetrically distributed with respect to the center of the disc.

Between the distributing disc 22 and the front wall 11P, as well as between the disc 22 and the mouth 19, holding means are provided but not shown in detail for the sake of simplicity.

The different conformations of the distributing discs 22, 22', 22" advantageously allow, together with the cited means for changing the angular speed, to obtain different possibilities of intermittence wherewith the airflow F''' enters into the blades 5 of the WECS. In this way it is advantageously possible to obtain a particular intermittence possibly required by experimental tests, once verified that such intermittence values of the flow do improve the effectiveness of the de-icing and anti-icing arrangement of the WECS in determined operating and ambient conditions.

The distributing discs 22, 22', 22" of FIG. 11 can be further used in another variant of the WECS according to the invention. They, together with the means for varying the angular speed, can be in fact directly inserted inside the front wall 11P of the capsule 11 of the WECS 1", replacing the fixed partition present in the configuration of FIG. 10. In this case there are radial holding means between the external side of the discs 22, 22', 22" and the internal side of the front wall 11P of the capsule 11, that keep the necessary insulation of the accumulation volume of the circulating airflow F''.

Advantageously this embodiment is relatively simple in constructive complexity with respect to the variant of FIG. 10, at the same time allowing a great variability of intermittence for the circulating airflow F'''.

Figure 12:
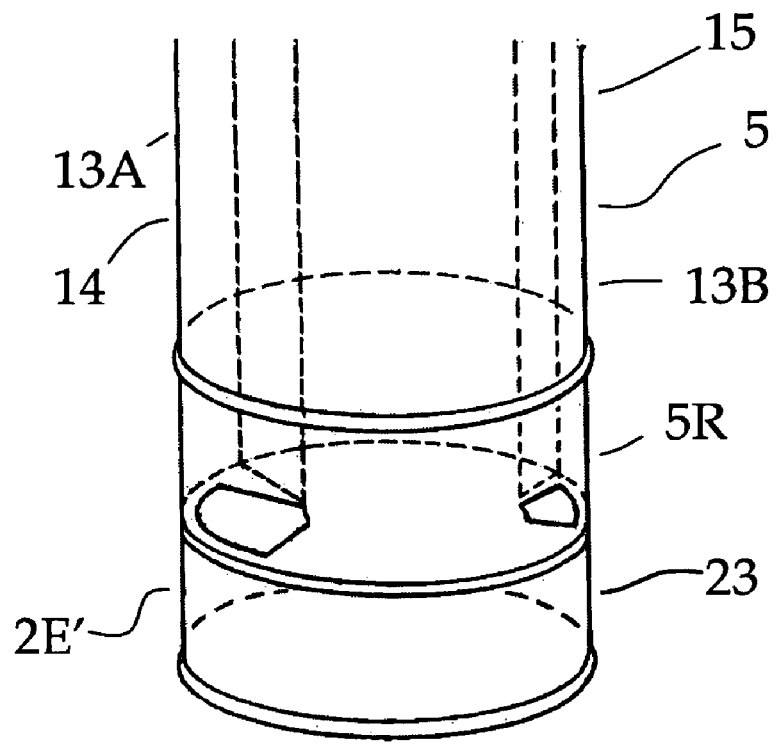

FIG. 12 shows a further alternative embodiment of the de-icing and anti-icing arrangement or the WECS of the present invention. In particular it shows a schematic prospect view of the assembly of the blade 5 and the extender 2E', wherein the passage for the airflow F is present in the hub of the rotor, not shown for the sake of simplicity. The extender 2E', unlike the extender 2E of FIG. 1, comprises a one piece cylinder which connects between the hub 2F and each one of the blades 5, and has in fact a substantially cylindrical shape, but shows particularities. In effect, inside the extender 2E' there is a second distributing disc 23, placed against the root 5R of the blade 5, assembled in the extender 2E'. The second disc 23 is coupled to the extender 2E' in angularly movable sense with the aid of devices in the extender 2E' which are not shown for the sake of simplicity. This configuration of the second distributing disc 23 is adapted to substantially rotate on a shaft substantially coincidentally with the directions of the cylinder composing its the lateral surface.

It will be appreciated that, inside the root 5R of the blade 5, the partial views of the first bulkhead 13A and second bulkhead 13B, which respectively delimit the first internal volume 14 and the second internal volume 15 for the passage of the relevant airflows F1 and F2 in direction of the end of the blade 5E and therefore of the outflow holes or openings 12.

Figure 13:
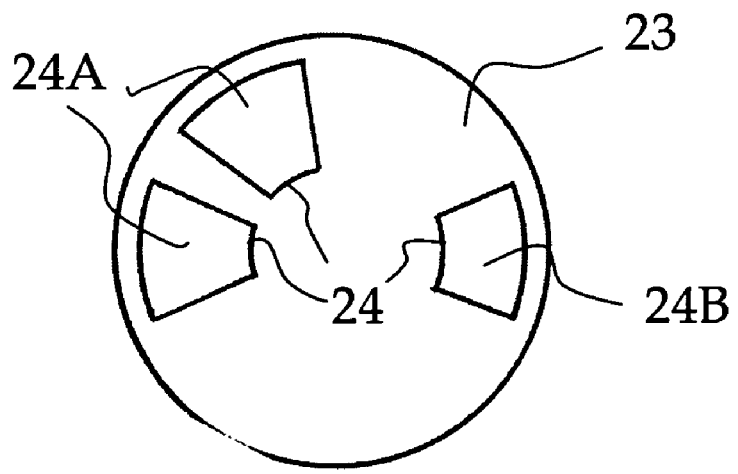
FIG. 13 is a top view of a part of the detail of the WECS of FIG. 12.

FIG. 13 illustrates a top view of the second distributing disc 23, in a further alternative embodiment. More particularly, it illustrates windows 24 having the shape of circular sectors, with dimensions substantially corresponding or slightly smaller than the passage sections of the volumes 14 and 15.

Such passage sections are defined by the shape and arrangement of the relevant first bulkhead 13A and second bulkhead 13B of the blade 5, which identify a determined extension both in a radial and circumferential sense. Therefore provided are a first type 24A of windows 24 that open the passage towards the first volume 14 defined by the first bulkhead 13A, for the passage of the airflow F towards the surface 5S of the blade 5 in correspondence of the leading edge of the relevant profiles 5P. Analogously, a second series 24B of windows 24 is shaped for the passage of the airflow F into the second volume 15 and from here to the surface 5S of the blade 5 in vicinity of the trailing edge of the relevant profiles 5P.

In representative embodiment, the second distributing disc 23 is virtually divided into six identical angular sectors, three that face the first volume 14 and comprise the two windows 24A of the first series, and three that face the second volume 15 and comprise the single window 24B of the second series. As a result, there are three operating possibilities for this second distributing disc 23:

1) windows 24 are arranged in correspondence of the volumes 14, 15 inside the blade 5 for allowing the passage of the airflows F1, F2 into the relevant volumes 14, 15, as shown in FIG. 12;

2) windows 24A of the first type are arranged in correspondence of the first volume 14, for the passage of the airflow F1, while the passage to the second volume 15 is stopped;

3) no window corresponds with volumes 14, 15 and therefore there is no supply of air to them.

Advantageously the solutions of FIG. 12 and FIG. 13 allow the further possibility of adjustments for the de-icing and anti-icing arrangement of the WECS, wherein control of the airflow distribution is provided to outflow from the holes or openings of the rotor blades. For instance, the air outflow from the holes may be interrupted for a determined period of time in order to increase the enthalpy content of the flowing out stream.

A further alternative embodiment of the WECS comprising the de-icing and anti-icing arrangement of the present invention is that of providing a fan and/or compressing means inside the capsule 11 of the nacelle 3 to carry out a forced convection of airflow F designed to outflow through the holes or the openings 12 of the rotor blades 5.

This embodiment allows the control of other two parameters for increasing the effectiveness of the de-icing and anti-icing arrangement, i.e. the mass and the pressure of the airflow F as output.

Figure 14:
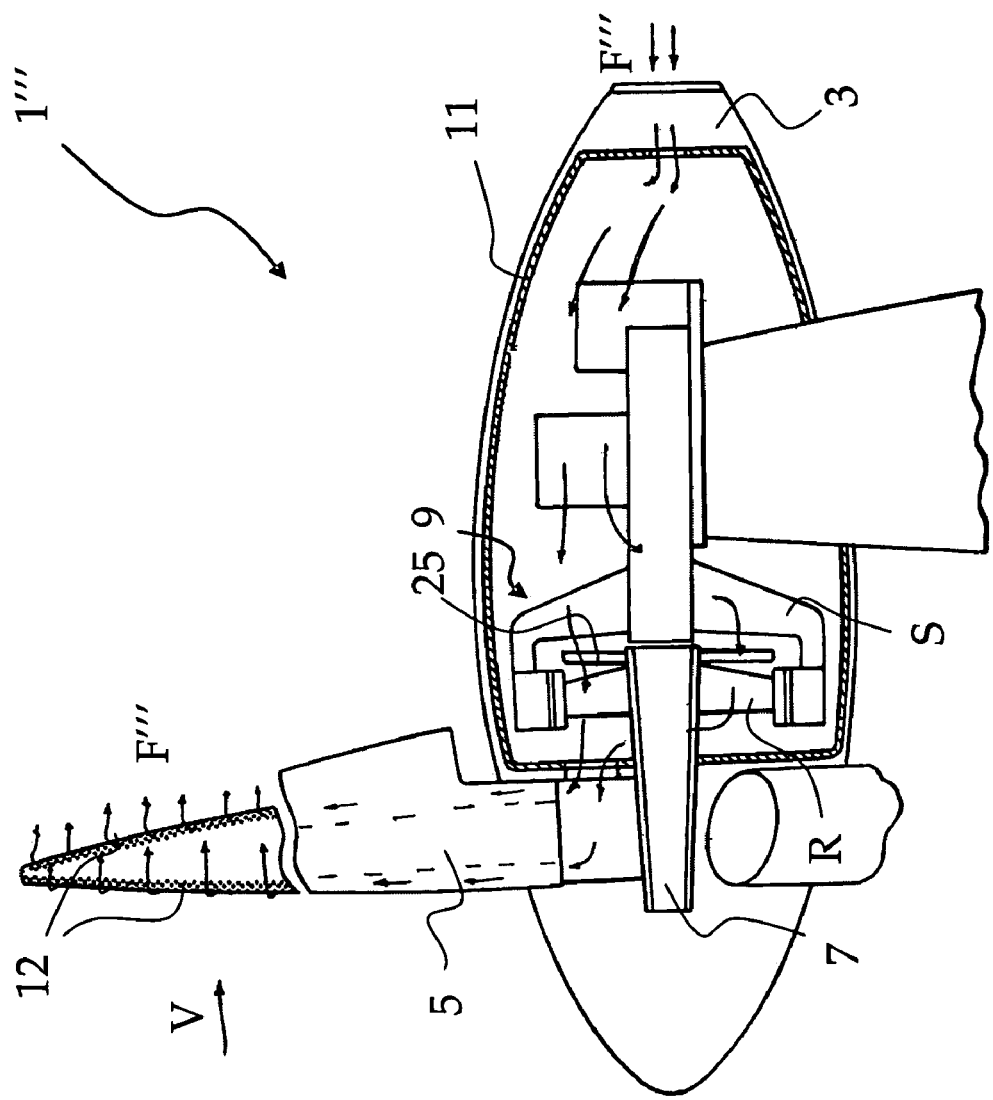

FIG. 14 illustrates a fan and/or compressing element 25 in a WECS 1''' according to this embodiment of the present invention. In this embodiment, the element is fastened on the rotating shaft 7, between the electric motor 9 rotating part R and the static part S. Element 25 may be of the type with variable pitch blades, for a better control of the airflow F''' inside the capsule 11, making it possible to vary the airflow F''' parameters.

Airflow F''' path is totally analogous to that shown in FIG. 8, with the difference that it is possible to introduce an acceleration or increase of the pressure according to well known related thermodynamic phenomena.

A further alternative of this embodiment is also foreseeable. That is, a compressor may be provided inside the capsule that is adapted to increase the pressure of the airflow directed to the outflow holes or openings, specifically the second series of holes (12T in FIG. 2) shaped as illustrated in FIG. 4c. As known from aeronautic literature, the outflow of a certain mass of air with a determined speed through a certain shape of hole in vicinity of the trailing edge of the profiles improves the aerodynamic efficiency characteristics of the blade such that the blade operates on the fluid stream with a greater incidence angle.

In conclusion such a solution permits a greater electric work to be collected during one year by the WECS according to the present invention, while the installed power is unchanged.

Furthermore a reduction in structural and dynamic masses is achieved, the electric work produced during one year is unchanged, and a savings is achieved in the installation, management and maintenance costs, as well as on the environmental impact on the territory where the system is located.

Yet another alternative embodiment of the de-icing and anti-icing arrangement of the present invention is that of providing a channels of materials having poor conducting thermal properties inside the blade, which lead the airflow to the blade areas, which are selectively provided with holes 12 for the outflow.

In this embodiment, the airflow is kept practically unchanged in its enthalpy content until it flows out through the holes or openings, and consequently provides better anti-icing effectiveness.

As the blade de-icing problem is concerned, i.e. the possibility of eliminating the ice already made for contingent reasons, the de-icing and anti-icing arrangement can be equally effective. In fact, further alternative embodiments to the WECS and the contained system according to the present invention can be provided. Supplying heat to the air inside the capsule of the gondola, for instance by means of thermo-resistors taking for a sufficient time enough electric power from the electric grid network, it is possible to heat up the first ice layers formed in correspondence of the openings or holes, until the ice masses slide down from the outside surface of the blades, so freeing them.

A further embodiment is that of providing the WECS with a small internal air-compressing device. The nozzles of the device may be suitably arranged inside the first and the second volume inside each one of the rotor blades. That is, by directing the nozzles towards the holes or openings partially or totally covered by the ice, pulses of compressed air may be delivered to break any accretion of ice and allow it to fall to the ground and free the previously iced blade. Both of the two immediately described alternative embodiments may be provided in the same WECS.

Advantageously the de-icing and anti-icing arrangement of the present invention further permits the installation of systems and/or devices apt to provide the de-icing effect even if the rotor is stopped. Although the de-icing and anti-icing arrangement allows the continuous operation of the WECS, in particularly critic environmental conditions, is such stops may be needed for temporary maintenance works.

In still another alternative embodiment, the WECS includes on the blade surface, holes dedicated to the outside introduction of fluids for the cyclic cleaning of the blades, such as alcohol or surfactant agents. Such an embodiment facilitates the cleaning of the blades and the restoration of the blades to the original status.

A further alternative embodiment provides a greater airflow into the inner capsule of the nacelle, and yet another embodiment is that of providing a dynamic air intake associated to the nacelle. In this embodiment, the air intake is conveniently shaped in a way to have an inlet section as orthogonal as possible with respect to the direction of the wind, and a passage through the capsule for sending the wind inside the capsule, and therefore to the accumulation volume. For its arrangement on the nacelle, it would be better to provide it in the rear part of the nacelle, for two reasons. The first is not having a particularly vortical inlet fluid stream and therefore with a lower pressure than that of the surrounding atmosphere. The second reason is due to the need that such fluid stream may lap all the electric power devices or systems present in the accumulation volume, so maximizing the enthalpy content of the airflow circulating by the de-icing and anti-icing arrangement.

Still for maximizing the thermal exchange, the WECS may also be provided with a wind turbine capsule internally covered with metal or thermally conducting material, and may connect such coating to the fins of the electric power devices. With such a solution a thermal bridge can be advantageously carried out, further increasing the heat exchange and so the convection inside the accumulation volume of the system.

What is claimed is:

1. A method for preventing and eliminating the ice accretion on the rotor blades of a wind energy converting system, the method comprising:

taking external air into an elevated nacelle;

passing said air through volumes defined within one or more blades, that are rotatably connected to the nacelle and rotating because of the wind hitting said blades; and ejecting at least part of said air through holes on the outer surfaces of said blades, wherein said holes are meant to generate an air layer upon said outer surfaces of said blades concerned with said holes, said air layer having an enthalpy content greater than said wind hitting at least one of said surfaces of said blades and interacting thermo-fluid-dynamically with said hitting wind and/or with any kind of substance possibly present on said external surfaces of said blades.

2. The method of claim 1, wherein a thermal exchange between said air and heated surfaces is provided before ejecting at least part of said air through holes on said outer surfaces of said blades.

3. The method of claim 1, wherein said substance possibly present on said external surfaces of said blades is water or ice.

4. A wind energy converting system, comprising:

an elevated nacelle adapted to take in external air;

one or more blades that are rotatably connected with the nacelle and rotating because of the wind hitting said blades, said blades having inside volumes for the flow of said air; and said blades comprising on at least part of an external surface holes through which said air passes on corresponding outer surfaces of the blade, wherein said holes are adapted to generate upon said outer surfaces of said blades concerned with said holes an air layer having an enthalpy content greater than said wind hitting at least one of said surfaces of said blades, this air layer interacting thermo-fluid-dynamically with said hitting wind and/or with any kind of substance possibly present on said external surfaces of said blades.

5. The system of claim 4, wherein said volumes for the flow of air inside said blades are divided into a plurality of volumes, comprising at least a first and a second volume.

6. The system of claim 5, wherein said first volume for the flow of said air connects to a first series of holes, located substantially in the vicinity of the leading edge of said one or more blades.

7. The system of claim 6, wherein said second volume for the flow of said connects to a second series of holes, located substantially in the vicinity of the trailing edge of said one or more blades.

8. The system of claim 6, wherein said holes are located preferably on the tip part of said one or more blades.

9. The system of claim 4, wherein at least part of said air is heated, before being ejected through said holes on said blades, by thermal exchange with heated surfaces.

10. The system of claim 9, wherein said heated surfaces are provided by the electric means for transforming the rotating motion of said rotor in order to generate electrical power.

11. The system of claim 9, wherein said heated surfaces are provided by a dissipating device of the power, taken from another power source external to said wind energy converting system, adapted to increase the enthalpy content of said air.

12. The system of claim 9, wherein said heated surfaces are provided by the further use of a transformer and/or of other auxiliary electric devices.

13. The system of claim 9, wherein said heated surfaces are located within said nacelle.

14. The system of claim 13, further comprising an accumulation volume for said air inside said nacelle, for facilitating the thermal exchange between said air and said heated surfaces.

15. The system of claim 14, wherein said accumulation volume is, in its external envelope, substantially made of a material with poor thermal conductivity.

16. The system of claim 14, wherein said accumulation volume is at least in part internally coated with thermal conductive material in connection with said heated surfaces, so as to constitute a thermal bridge for facilitating said thermal exchange.

17. The system of claim 14, wherein said accumulation volume is connected to one or more openings located in the rear part of said nacelle.

18. The system of claim 14, comprising one or more of a fan or of a compressor, wherein said one or more of a fan or a compressor circulate said air inside said accumulation volume.

19. The system of claim 4, further comprising distribution means of said air located between said nacelle and said blades.

20. The system of claim 19, further comprising:
first distribution means, associated to said nacelle and said volumes within said one or more blades, being adapted by means of said association to generate an intermittent flow of said air from said nacelle to said one or more blades.

21. The system of claim 20, further comprising an extender for the flow of said air connected to said volumes within said one or more blades.

22. The system of claim 21, wherein said extender includes baffles that further direct said air leaving said nacelle and entering said volumes within said one or more blades.

23. The system of claim 21, further comprising a distributing disc located between said nacelle and said extender.

24. The system of claim 23, wherein said distributing disc shows at least one or more through holes for the flow of said air, so that in at least an angular position of said distributing disc said trough holes are in correspondence of said extender.

25. The system of claim 21, further comprising:
second distribution means associated to said extender, being adapted by means of said association to selectively allow the entry of said air into said volumes within said one or more blades.

26. The system of claim 25, wherein said second distribution means further comprises a second distributing disc being positioned to rotate inside said extender.

27. The system of claim 26, wherein said second distributing disc shows at least one or more through holes for the flow of said air, said through holes having an area substantially comparable with said volumes within said one or more blades.

28. The system of claim 4, wherein said external surface of said one or more blades is constructed by overlapping a multiplicity of shaped sheets having said holes.

29. The system of claim 28, wherein said external surface of said one or more blades is constructed using composite material.

30. The system of claim 28, wherein said external surface of said one or more blade includes an upper semi-shell and a lower semi-shell.

31. The system of claim 4, wherein at least part of said holes for the passage of said air have a constant section for the passage of said air.

32. The system of claim 4, wherein at least part of said holes for the passage of said air have a divergent shape with a substantially orthogonal axis.

33. The system of claim 4, wherein at least part of said holes for the passage of said air have substantially parallel walls and an inclined axis.

* * * * *

UNITED STATES PATENT AND TRADEMARK OFFICE
CERTIFICATE OF CORRECTION

PATENT NO. : 7,637,715 B2  Page 1 of 1
APPLICATION NO. : 11/108546
DATED : December 29, 2009
INVENTOR(S) : Lorenzo Battisti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 894 days.

Signed and Sealed this

Ninth Day of November, 2010

David J. Kappos
*Director of the United States Patent and Trademark Office*